(12) United States Patent
Tuda

(10) Patent No.: US 9,092,713 B2
(45) Date of Patent: Jul. 28, 2015

(54) IC CARD CONTROLLING ACCESS TO FILES ACCORDING TO CONDITIONS, AND MANUFACTURING METHOD, ISSUING METHOD, AND COMMUNICATION METHOD OF THE SAME

(75) Inventor: Yusuke Tuda, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 663 days.

(21) Appl. No.: 13/267,077

(22) Filed: Oct. 6, 2011

(65) Prior Publication Data
US 2012/0235789 A1    Sep. 20, 2012

(30) Foreign Application Priority Data

Mar. 17, 2011  (JP) ................................ 2011-059719

(51) Int. Cl.
*G08B 29/00* (2006.01)
*H05K 3/00* (2006.01)
(Continued)

(52) U.S. Cl.
CPC ........ *G06K 19/07769* (2013.01); *G06K 7/0004* (2013.01); *G06K 19/07309* (2013.01); *G06Q 20/352* (2013.01); *G06Q 20/35765* (2013.01);
(Continued)

(58) Field of Classification Search
CPC ............ G06K 19/07769; G06K 15/40; G06K 19/07309; G06K 19/07; G06K 19/0723; G06K 7/0004; G06K 9/00885; G06K 19/0701; G06K 19/072; G06K 19/07707; G06K 19/07737; G06K 19/07749; G06K 19/07756; G06K 19/07766; G06K 7/0021; G06K 7/0086; G06K 7/10237; G06K 7/10297

USPC ................... 340/5.74, 1.1, 5.1, 5.2; 235/492; 29/829; 455/41.1; 257/728
See application file for complete search history.

(56) References Cited

U.S. PATENT DOCUMENTS

| | | | |
|---|---|---|---|
| 6,899,277 B2 * | 5/2005 | Kawano et al. | 235/492 |
| 7,953,368 B2 * | 5/2011 | Miwa et al. | 455/41.1 |

(Continued)

FOREIGN PATENT DOCUMENTS

| | | | |
|---|---|---|---|
| AU | 752627 B2 | | 6/2000 |
| AU | 752627 B2 * | | 9/2002 |

(Continued)

OTHER PUBLICATIONS

Office Action mailed Aug. 2, 2012 in corresponding Singapore Patent Application No. 201107421-8.

(Continued)

*Primary Examiner* — Steven Lim
*Assistant Examiner* — Sisay Yacob
(74) *Attorney, Agent, or Firm* — Posz Law Group, PLC

(57) ABSTRACT

According to one embodiment, an IC card includes an IC module and a substrate. The IC module includes a plurality of communication units, a storage unit, and a controller. The storage unit stores first data, and stores an access condition for the first data. The controller permits, when the access condition includes information which permits an access to the first data based on a reception command received via a first communication unit of the plurality of communication units, an access to the first data based on a first command received via the first communication unit, and does not permits an access to the first data based on a second command received via a second communication unit of the plurality of communication units.

14 Claims, 8 Drawing Sheets

(51) Int. Cl.
*G06K 19/073* (2006.01)
*G06K 19/077* (2006.01)
*G06K 7/00* (2006.01)
*G06Q 20/34* (2012.01)
*G07F 7/08* (2006.01)

(52) U.S. Cl.
CPC ......... *G07F 7/0813* (2013.01); *Y10T 29/49124* (2015.01)

(56) References Cited

U.S. PATENT DOCUMENTS

| | | | |
|---|---|---|---|
| 2002/0170975 A1* | 11/2002 | Kawano et al. | 235/492 |
| 2005/0033688 A1 | 2/2005 | Peart et al. | |
| 2005/0242921 A1 | 11/2005 | Zimmerman et al. | |
| 2006/0138653 A1* | 6/2006 | Miwa et al. | 257/728 |
| 2010/0023491 A1 | 1/2010 | Huang et al. | |

FOREIGN PATENT DOCUMENTS

| | | | |
|---|---|---|---|
| CN | 1289428 A | 3/2001 | |
| CN | 101163149 A | 4/2008 | |
| CN | 101282330 A | 10/2008 | |
| CN | 101674334 A | 3/2010 | |
| CN | 101908120 A | 12/2010 | |
| CN | 101930555 A | 12/2010 | |
| DE | 198 55 596 A1 | 6/2000 | |
| EP | 1 258 831 A2 | 11/2002 | |
| EP | 1 544 809 | 6/2005 | |
| EP | 1 770 659 A1 | 4/2007 | |
| EP | 2045987 A1 | 4/2009 | |
| EP | 2 128 803 A1 | 12/2009 | |
| JP | 2000-011063 A | 1/2000 | |
| JP | 2000-123139 A | 4/2000 | |
| JP | 2001-101362 A | 4/2001 | |
| JP | 2001-312701 A | 11/2001 | |
| JP | 2002-531904 A | 9/2002 | |
| JP | 2004-258740 A | 9/2004 | |
| JP | 2010-211515 A | 9/2010 | |
| JP | 2011-002895 A | 1/2011 | |

OTHER PUBLICATIONS

Background Art Information Sheet (2 pages).
Office Action dated Jun. 27, 2014 issued in corresponding CN patent application No. 201110324377.9 (and English translation).
Extended European Search Report dated Apr. 25, 2014 issued in corresponding EP patent application No. 11184472.6.
ISO: "Identification Cards—Integrated Circuit Cards—Part 4: Oranization, Security and Commands for Interchange" ISO/IEC 7816-4. International Standard ISO/IEC, Jan. 15, 2005.
Office Action mailed Apr. 15, 2014 issued in corresponding JP patent application No. 2011-059719 (and English translation).
Office action mailed Jan. 7, 2014 in the corresponding JP application No. 2011-059719 (and English translation).
Office Action mailed Feb. 15, 2015 issued in corresponding CN patent application No. 201110324377.9.

* cited by examiner

Registered information of EF412 and EF422

| tag | | Value |
|---|---|---|
| 6F | 84 | DF Name |
| | 86 | Security attribute in proprietary format |
| | A5 | Proprietary informetion encoded in BER-TLV |

For example, data are set in data field of tag86 as follows
→ 86 03 81 01 01 (permit access via first communication interface)
→ 86 03 82 01 01 (permit access via logical channel LC1)

Security attribute in proprietary format tag81

| B8 | B7 | B6 | B5 | B4 | B3 | B2 | B1 | Meaning |
|---|---|---|---|---|---|---|---|---|
| 0 | 0 | 0 | 0 | 0 | 0 | 0 | 0 | Permit access via all communication interfaces |
| 0 | 0 | 0 | 0 | x | x | x | x | Access control using communication interface |
| 0 | 0 | 0 | 0 | 1 | - | - | - | Permit access via fourth communication interface |
| 0 | 0 | 0 | 0 | - | 1 | - | - | Permit access via third communication interface |
| 0 | 0 | 0 | 0 | - | - | 1 | - | Permit access via second communication interface |
| 0 | 0 | 0 | 0 | - | - | - | 1 | Permit access via first communication interface |

*Example of case in which first to fourth communication interfaces (4 types) are supported

F I G. 10

Security attribute in proprietary format tag82

| B8 | B7 | B6 | B5 | B4 | B3 | B2 | B1 | Meaning |
|---|---|---|---|---|---|---|---|---|
| 0 | 0 | 0 | 0 | 0 | 0 | 0 | 0 | Permit access via all logical channels |
| 0 | 0 | 0 | 0 | 0 | x | x | x | Access control using logical channel |
| 0 | 0 | 0 | 0 | 0 | 1 | - | - | Permit access via logical channel LC3 |
| 0 | 0 | 0 | 0 | 0 | - | 1 | - | Permit access via logical channel LC2 |
| 0 | 0 | 0 | 0 | 0 | - | - | 1 | Permit access via logical channel LC1 |

*Example of case in which logical channels LC1 to LC3 are supported
(when logical channels LC1 to LC19 are used, pieces of access limitation
information corresponding to logical channels LC1 to LC19 are set)

F I G. 11

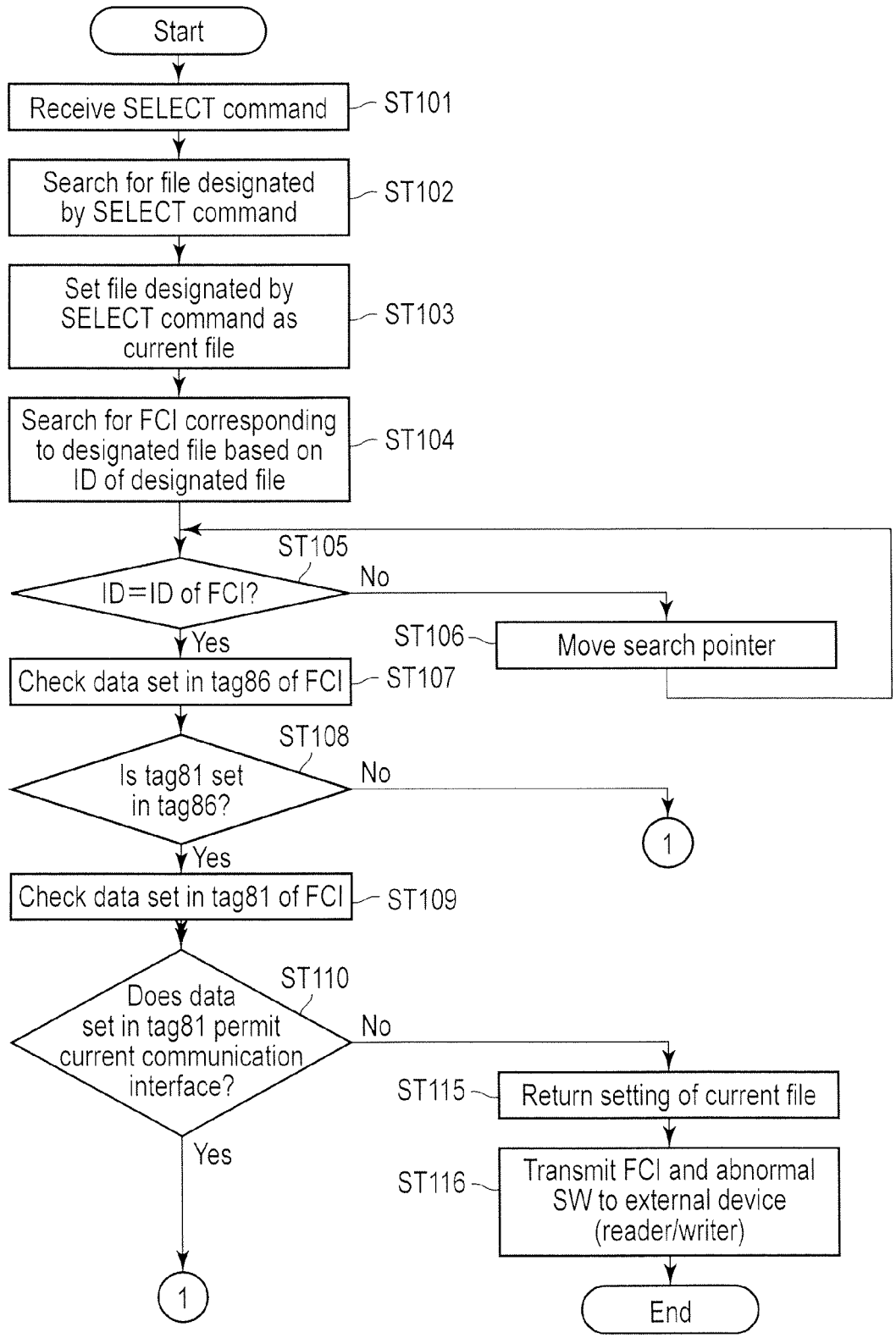
F I G. 12A

US 9,092,713 B2

IC CARD CONTROLLING ACCESS TO FILES ACCORDING TO CONDITIONS, AND MANUFACTURING METHOD, ISSUING METHOD, AND COMMUNICATION METHOD OF THE SAME

CROSS-REFERENCE TO RELATED APPLICATIONS

This application is based upon and claims the benefit of priority from prior Japanese Patent Application No. 2011-059719, filed Mar. 17, 2011, the entire contents of which are incorporated herein by reference.

FIELD

Embodiments described herein relate generally to an IC card, IC card manufacturing method, IC card issuing method, and communication method.

BACKGROUND

In recent years, portable electronic devices (communication media) called IC cards or smart cards have prevailed remarkably. For example, IC cards are used in various fields not only as credit cards, commuter passes, passports, license cards, and settlements of other commercial trades, but also as ID cards such as employee ID cards, membership cards, and insurance cards.

An IC card incorporates an IC (integrated circuit) chip which has a nonvolatile data memory and a control element such as a CPU. An IC card processing apparatus such as an IC card reader/writer transmits a read command to an IC card to read out data from the IC card, and transmits a write command to the IC card to write data in the IC card.

The IC card includes a plurality of communication units, and can communicate with the IC card processing apparatus via the respective communication units. For example, the IC card can communicate with the IC card processing apparatus via one of a plurality of communication interfaces. Alternatively, the IC card can communicate with the IC card processing apparatus via one of a plurality of logical channels.

For example, when the IC card includes first and second communication interfaces, data stored in the IC card may be unwantedly accessed from both of the first and second communication interfaces. Likewise, when the IC card supports first and second logical channels, data stored in the IC card may be unwantedly accessed from both of the first and second logical channels.

BRIEF DESCRIPTION OF THE DRAWINGS

FIG. 10 is a table showing an example of access limitation information for communication interfaces;

FIG. 11 is a table showing an example of access limitation information for logical channels;

FIG. 12A is a flowchart showing an example of the access limitation processing.

DETAILED DESCRIPTION

In general, according to one embodiment, an IC card includes an IC module and a substrate. The IC module includes a plurality of communication units, a storage unit, and a controller. The storage unit stores first data, and stores an access condition for the first data. The controller permits, when the access condition includes information which permits an access to the first data based on a reception command received via a first communication unit of the plurality of communication units, an access to the first data based on a first command received via the first communication unit, and does not permits an access to the first data based on a second command received via a second communication unit of the plurality of communication units.

Embodiments will be described hereinafter with reference to the drawings.

Figure 1:
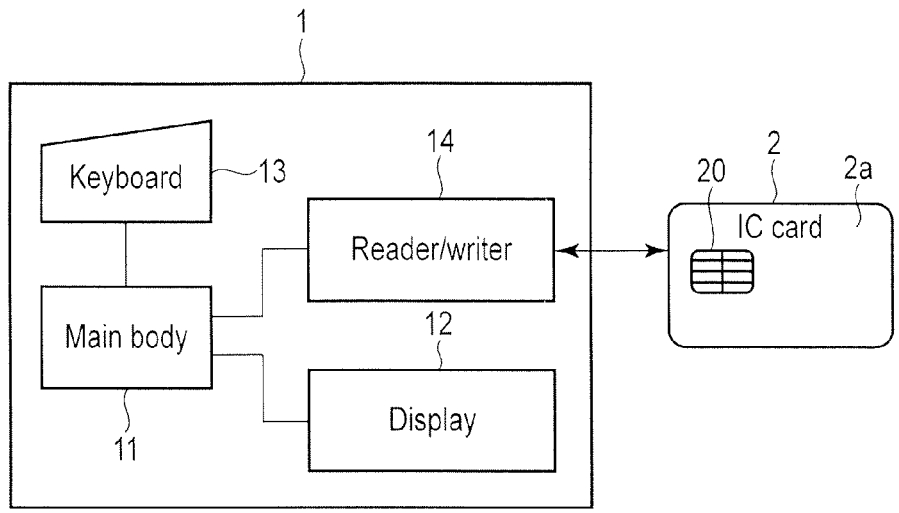
FIG. 1 is a schematic block diagram showing an example of the arrangement of an IC card system of respective embodiments.

FIG. 1 is a schematic block diagram showing the arrangement of an IC card system (also called a smart card system) of respective embodiments. As shown in FIG. 1, the IC card system includes a terminal 1 (communication apparatus) and IC card 2 (communication medium). The terminal 1 includes a main body (host apparatus) 11, display 12, keyboard 13, and reader/writer 14. The terminal 1 can communicate with the IC card 2. The terminal 1 transmits a read command to the IC card 2 to read out data from the IC card 2, and transmits a write command to the IC card 2 to write data in the IC card 2.

The main body 11 selects one of a plurality of communication methods, or selects one of a plurality of logical channels. The display 12 displays, for example, a communication result and authentication result with the IC card 2. The keyboard 13 is used to input characters, numerals, and the like to the main body 11. The reader/writer 14 communicates with the IC card 2.

Figure 2:
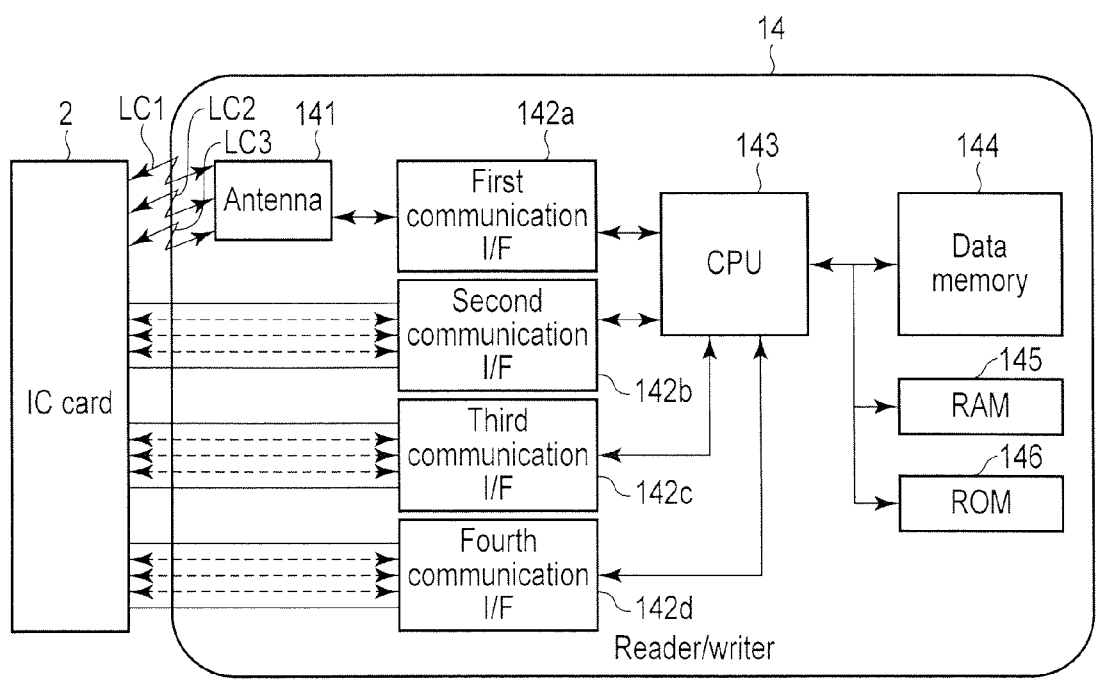
FIG. 2 is a schematic block diagram showing an example of the arrangement of a card reader/writer of respective embodiments.

FIG. 2 is a schematic block diagram showing the arrangement of the reader/writer 14 of respective embodiments. As shown in FIG. 2, the reader/writer 14 includes an antenna 141, first communication interface 142a, second communication interface 142b, third communication interface 142c, fourth communication interface 142d, CPU 143, data memory 144, RAM 145, and ROM 146. The CPU 143 controls transmission of various commands to the IC card 2.

As shown in FIG. 2, the reader/writer 14 can communicate with the IC card 2 (first communication interface 201a) via the first communication interface 142a (for example, the antenna 141) in a non-contact manner. The reader/writer 14 can also communicate with the IC card 2 (second communication interface 201b) via the second communication interface 142b (for example, a metal terminal of the second communication interface 142b) in a contact manner. The reader/writer 14 can also communicate with the IC card 2 (third communication interface 201c) via the third communication interface 142c (the antenna or a metal terminal) in a non-contact or contact manner. The reader/writer 14 can also communicate with the IC card 2 (fourth communication interface 201d) via the fourth communication interface 142d (the antenna or a metal terminal) in a non-contact or contact manner.

Figure 3:
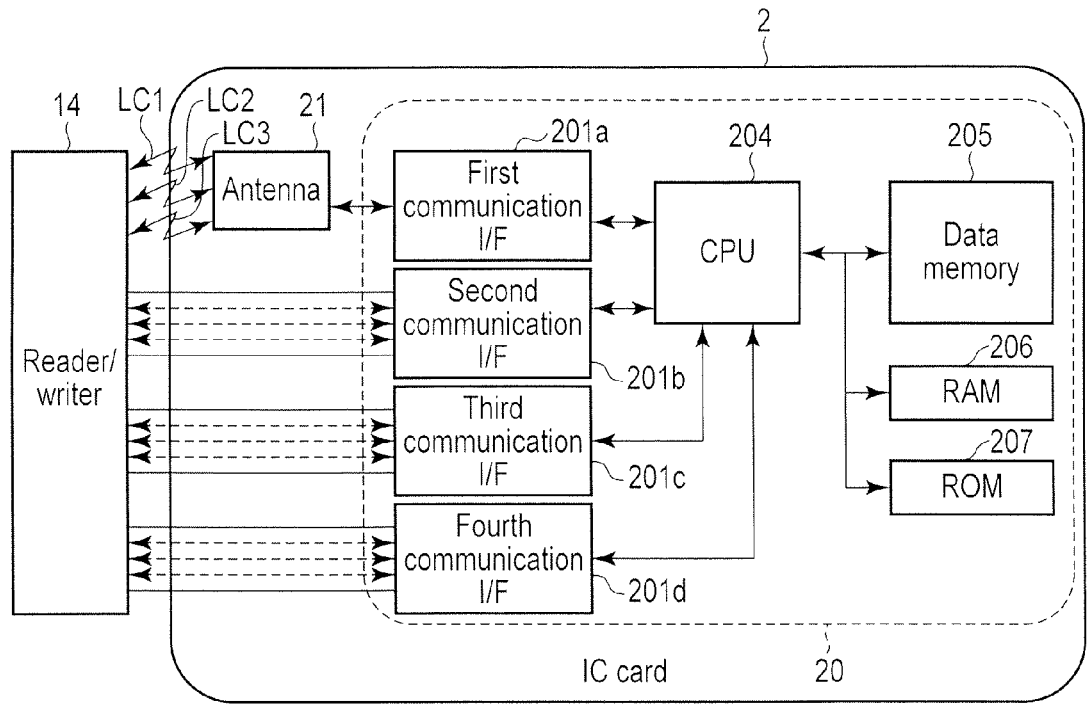
FIG. 3 is a schematic block diagram showing an example of the arrangement of an IC card of respective embodiments.

FIG. 3 is a schematic block diagram showing the arrangement of the IC card of respective embodiments. As shown in FIG. 3, the IC card 2 includes a substrate (for example, a plastic card) 2a and an IC module (IC chip 20). The IC chip 20 includes a plurality of communication units, CPU 204, data memory 205, RAM 206, and ROM 207. For example, the IC chip 20 includes, as the plurality of communication units, a first communication interface 201a (first communication unit), second communication interface 201b (second communication unit), third communication interface 201c (third communication unit), and fourth communication interface 201d (fourth communication unit). Furthermore, as shown in FIG. 3, the IC card 2 includes an antenna 21. Note that the IC module may include the antenna 21. The CPU 204 serves as, for example, a controller, which controls to interpret a command transmitted from the terminal 1, to execute the command, and to return a command execution result to the terminal 1. The data memory 205 is a nonvolatile memory.

As shown in FIG. 3, the IC card 2 can communicate with the reader/writer 14 (first communication interface 142a) via the first communication interface 201a (for example, the antenna 21) in a non-contact manner. The IC card 2 can also communicate with the reader/writer 14 (second communication interface 142b) via the second communication interface 201b (for example, a metal terminal of the second communication interface 201b) in a contact manner. The IC card 2 can also communicate with the reader/writer 14 (third communication interface 142c) via the third communication interface 201c (the antenna or a metal terminal) in a non-contact or contact manner. The IC card 2 can also communicate with the reader/writer 14 (fourth communication interface 142d) via the fourth communication interface 201d (the antenna or a metal terminal) in a non-contact or contact manner.

Communication limitations by the IC card system will be described below.

(First Embodiment)

Figures 8, 9:
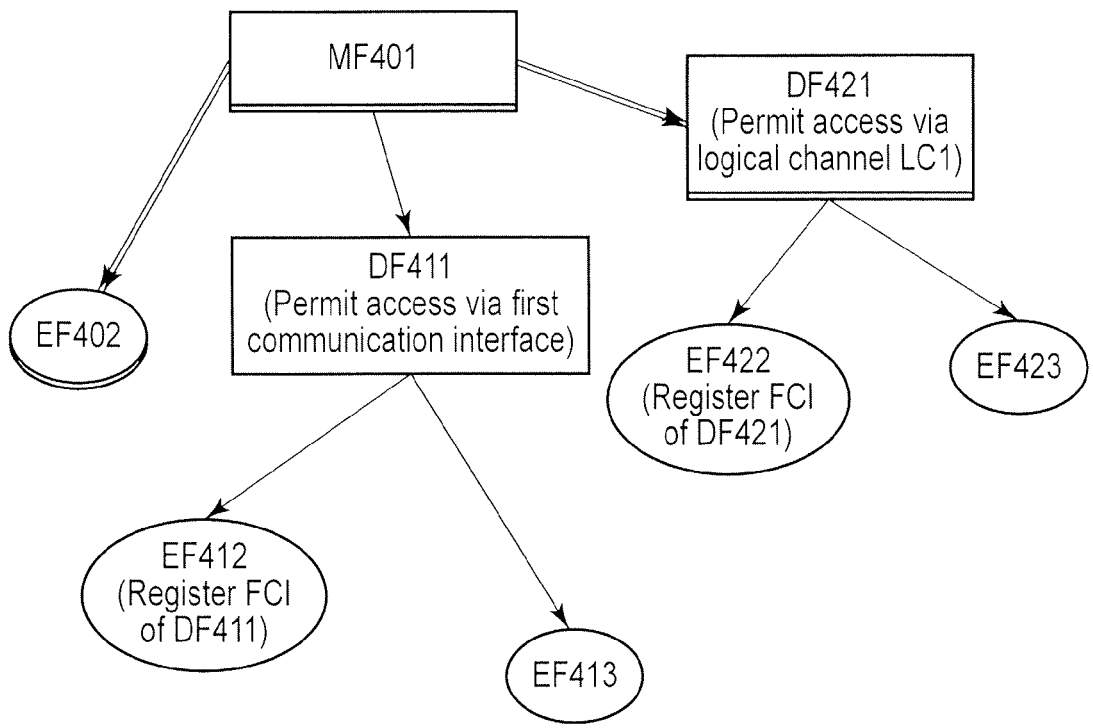
FIG. 8 is a view showing an example of a data structure in the IC card.
FIG. 9 is a table showing an example of a storage location of access limitation information.

FIG. 8 shows an example of a file structure formed on the data memory 205 of the IC card 2. "MF" shown in FIG. 8 means a master file; "DF", a dedicated file; "EF", an elementary file; "FCI", file control information. As shown in FIG. 8, the data memory 205 stores a file structure in which each EF belongs to a DF, and the DF located at the uppermost position is called an MF.

For example, at the time of issuance of the IC card 2 (at the time of data registration in the IC card 2), the reader/writer 14 writes, in the data memory 205, access limitation information (access condition) required to limit an access to first data in the data memory 205 of the IC card 2. Thus, an access to the first data stored in the IC card 2 can be limited.

As shown in FIG. 8, an EF412 belongs to a DF411, and includes FCI of the DF411. In this case, for example, the reader/writer 14 writes access limitation information AL11 required to limit an access to the DF411 in the IC card 2 in the FCI of the DF411. For example, the access limitation information AL11 includes information which permits a data access based on a reception command received via the first communication interface 201a (first communication unit).

According to the access limitation information AL11, the CPU 204 of the IC card 2 permits a data access to the DF411 based on a first command received via the first communication interface 201a, and does not permit any data access to the DF411 based on a second command received via the second communication interface 201b, third communication interface 201c, or fourth communication interface 201d.

FIG. 9 shows an example of a storage location of the access limitation information. The EF412 stores data of a TLV (Tag, Length, Value) structure. For example, as shown in FIG. 9, the EF412 stores Tag86, Length03, and Value(81 01 01), and Value(81 01 01) has a data structure of Tag81, Length01, and Value01. Value01 indicates information which permits a data access to the DF411 based on the first command received via the first communication interface 201a. That is, the access limitation information is registered by Security attribute in proprietary format tag81 specified by ISO/IEC 7816-4:2005.

FIG. 10 shows an example of access limitation information for each communication interface. As shown in FIG. 10, for example, the access limitation information is configured by a total of 8 bits, that is, the eighth to first bits. For example, when all of the eighth to first bits which configure the access limitation information are "0", this access limitation information indicates that data accesses based on reception commands received via all of the first communication interface 201a, second communication interface 201b, third communication interface 201c, and fourth communication interface 201d are permitted.

When the fourth bit which configures the access limitation information is "1", this access limitation information (access limitation information AL14) indicates that a data access based on a reception command received via the fourth communication interface 201d is permitted. When the third bit which configures the access limitation information is "1", this access limitation information (access limitation information AL13) indicates that a data access based on a reception command received via the third communication interface 201c is permitted. When the second bit which configures the access limitation information is "1", this access limitation information (access limitation information AL12) indicates that a data access based on a reception command received via the second communication interface 201b is permitted. When the first bit which configures the access limitation information is "1", this access limitation information (access limitation information AL11) indicates that a data access based on a reception command received via the first communication interface 201a is permitted.

That is, when the fourth, third, second, and first bits, which configure the access limitation information, are respectively "1", "1", "0", and "0", this access limitation information indicates that a data access based on a reception command received via the fourth communication interface 201d or third communication interface 201c is permitted. In other words, the access limitation information can limit the number of communication interfaces that can be used.

Access limitation processing by the IC card 2 which holds the aforementioned access limitation information will be described below. For example, a case will be explained wherein the FCI included in the EF412 of the IC card 2 includes the access limitation information AL11.

Figure 4:
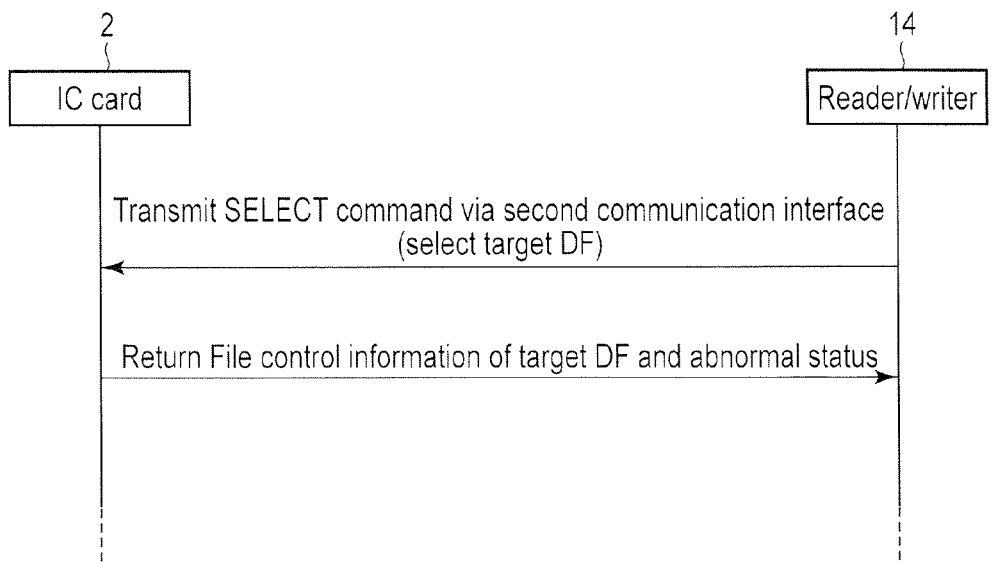
FIG. 4 is a flowchart showing an example in which access limitation processing denies a data access via a predetermined communication interface.
Figure 5:
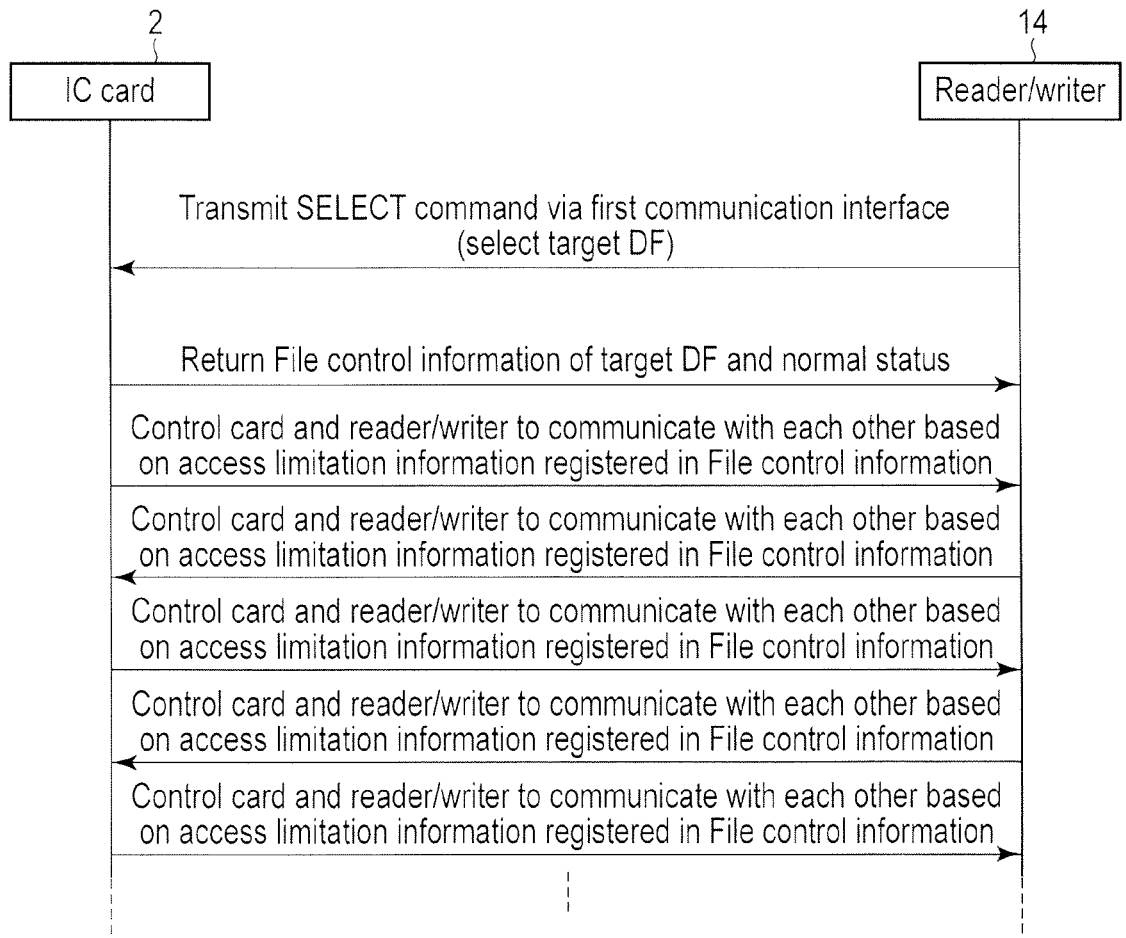
FIG. 5 is a flowchart showing an example in which the access limitation processing permits a data access via a predetermined communication interface.
Figure 12B:
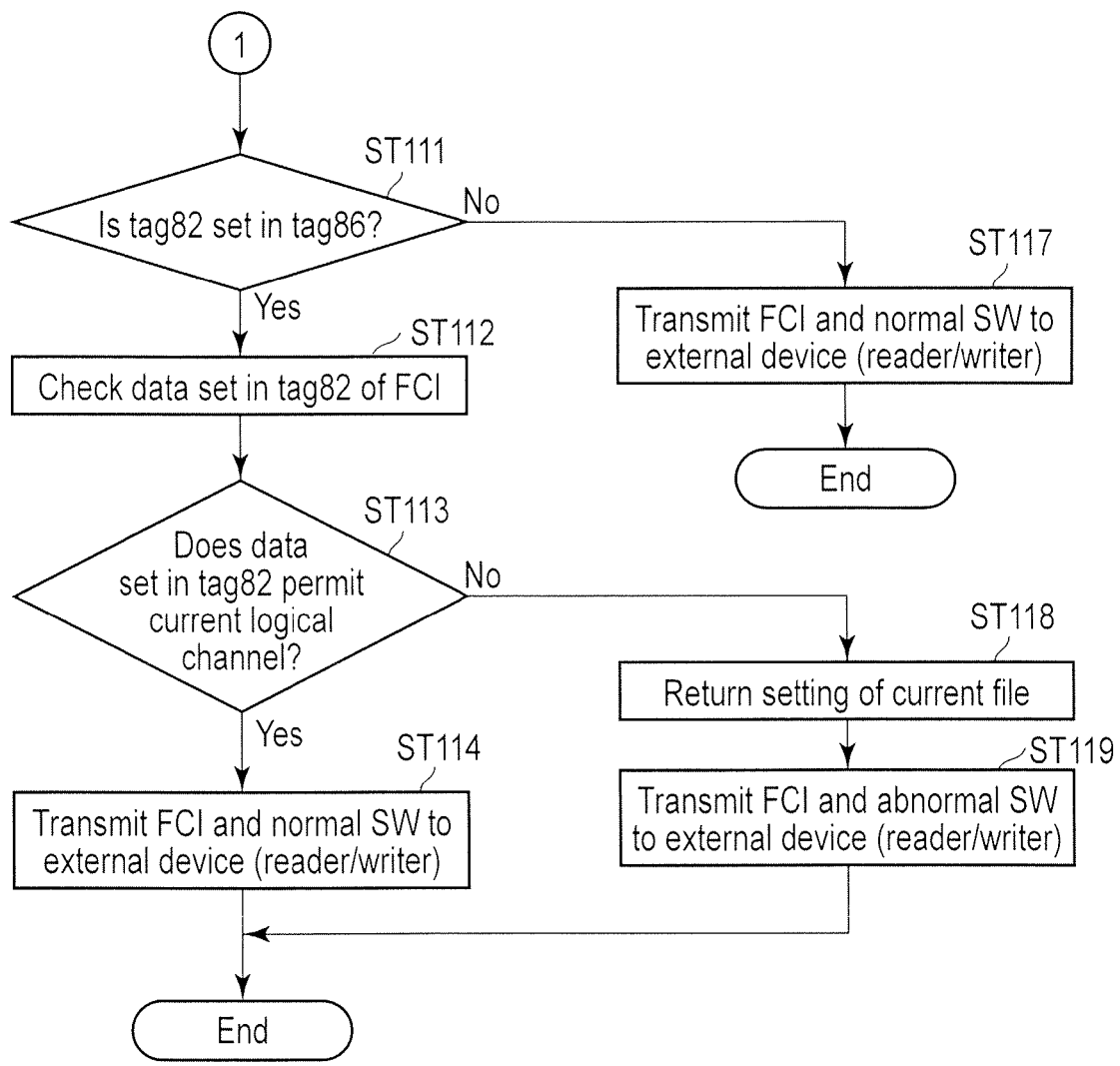
FIG. 12B is a flowchart showing an example of the access limitation processing.

FIG. 4 is a flowchart showing an example in which the access limitation processing denies a data access via a predetermined communication interface. FIG. 5 is a flowchart showing an example in which the access limitation processing permits a data access via a predetermined communication interface. FIGS. 12A and 12B are flowcharts showing an example of details of the access limitation processing by the IC card.

For example, as shown in FIG. 4, the reader/writer 14 transmits a select command (selection of the DF411) to the IC card 2 via the second communication interface 142b. The IC card 2 receives the select command via the second communication interface 201b. The CPU 204 of the IC card 2 denies an access to the DF411 based on the select command according to the access limitation information AL11 included in the FCI of the DF411, and returns the FCI of the DF411 and an abnormal status.

As shown in FIG. 5, the reader/writer 14 transmits a select command (selection of the DF411) to the IC card 2 via the first communication interface 142a. The IC card 2 receives the select command via the first communication interface 201a. The CPU 204 of the IC card 2 permits an access to the DF411 based on the select command according to the access limitation information AL11 included in the FCI of the DF411, and returns the FCI of the DF411 and a normal status. After that, the reader/writer 14 and IC card 2 exchange data.

Furthermore, the aforementioned access limitation processing will be described in detail below with reference to FIGS. 12A and 12B. As shown in FIG. 12A, the IC card 2 receives a select command via one of the first communication interface 201a, second communication interface 201b, third communication interface 201c, and fourth communication interface 201d (ST101).

The CPU 204 searches for a file (for example, the DF411) designated by the select command (ST102). If the CPU 204 finds the DF411 designated by the select command, it sets the DF411 as a current file (ST103). After that, the CPU 204 searches for FCI (for example, the EF412) corresponding to the DF411 based on an ID of the DF411 (ST104).

The CPU 204 finds out FCI having the same ID as that of the DF411 (YES in ST105), and checks data set in Tag86 of the found FCI (ST107). If the CPU 204 detects that Tag81 is set in Tag86 (YES in ST108), it checks data set in Tag81 (ST109). The CPU 204 checks data set in Tag81, that is, access limitation information.

For example, a case will be assumed below wherein the IC card 2 receives a select command via the first communication interface 201a (ST101), and the access limitation information AL11 is set in Tag81 stored in the IC card 2. In this case, the CPU 204 permits a data access based on a reception command received via the first communication interface 201a according to the access limitation information AL11 (YES in ST110), and returns the FCI of the DF411 and a normal status (SW) (ST117).

Alternatively, a case will be assumed below wherein the IC card 2 receives a select command via the second communication interface 201b (ST101), and the access limitation information AL11 is set in Tag81 stored in the IC card 2. In this case, the CPU 204 denies a data access based on a reception command received via the second communication interface 201b according to the access limitation information AL11 (NO in ST110), re-sets a current file from the DF411 to an original file (ST115), and returns the FCI of the DF411 and an abnormal status (SW) (ST116).

As descried above, according to the first embodiment, an IC card and communication method, which can limit accesses for respective communication units (respective communication interfaces) can be provided.

(Second Embodiment)

For example, at the time of issuance of the IC card 2, the reader/writer 14 writes, in the data memory 205, access limitation information (access condition) required to limit an access to second data in the data memory 205 of the IC card 2. Thus, an access to the second data stored in the IC card 2 can be limited.

As shown in FIG. 8, an EF422 belongs to a DF421, and includes FCI of the DF421. In this case, for example, the reader/writer 14 writes access limitation information AL21 required to limit an access to the DF421 in the IC card 2 in the FCI of the DF421. For example, the access limitation information AL21 includes information which permits a data access based on a reception command received via a logical channel LC1 (first communication unit). According to the access limitation information AL21, the CPU 204 of the IC card 2 permits a data access to the DF421 based on a first command received via the logical channel LC1 supported by a predetermined communication interface (for example, the first communication interface 201a), and does not permit any data access to the DF421 based on a second command received via a logical channel LC2 or LC3 supported by a predetermined communication interface.

For example, as shown in FIG. 9, the EF412 stores Tag86, Length03, and Value(82 01 01), and Value(82 01 01) has a data structure of Tag82, Length01 and Value01. Then, Value01 indicates information which permits a data access to the DF421 based on the first command received via the logical channel LC1. That is, the access limitation information is registered by Security attribute in proprietary format tag82 specified by ISO/IEC 7816-4:2005.

FIG. 11 shows an example of the access limitation information for each logical channel. As shown in FIG. 11, for example, the access limitation information is configured by a total of 8 bits, that is, the eighth to first bits. For example, when all of the eighth to first bits which configure the access limitation information are "0", this access limitation information indicates that data accesses based on reception commands received via all of the logical channels LC1, LC2, and LC3 are permitted.

When the third bit which configures the access limitation information is "1", this access limitation information (access limitation information AL23) indicates that a data access based on a reception command received via the logical channel LC3 is permitted. When the second bit which configures the access limitation information is "1", this access limitation information (access limitation information AL22) indicates that a data access based on a reception command received via the logical channel LC2 is permitted. When the first bit which configures the access limitation information is "1", this access limitation information (access limitation information AL21) indicates that a data access based on a reception command received via the logical channel LC1 is permitted.

That is, when the third, second, and first bits which configure access limitation information are respectively "1", "1", and "0", this access limitation information indicates that a data access based on a reception command received via the logical channel LC3 or LC2 is permitted. In other words, the access limitation information can limit the number of logical channels that can be used.

Access limitation processing by the IC card 2 which holds the aforementioned access limitation information will be described below. For example, a case will be explained below wherein the FCI included in the EF422 of the IC card 2 includes the access limitation information AL21.

Figure 6:
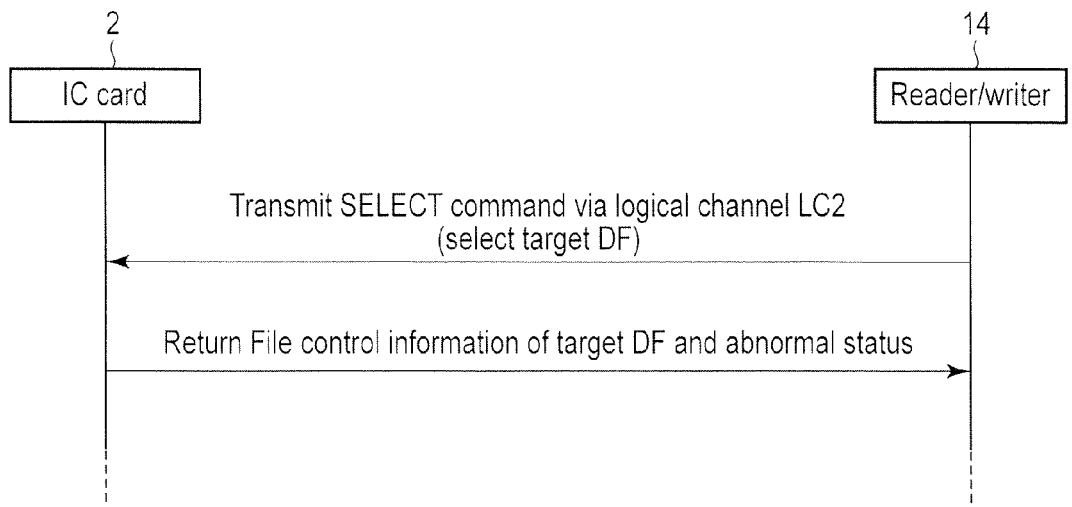
FIG. 6 is a flowchart showing an example in which the access limitation processing denies a data access via a predetermined logical channel.
Figure 7:
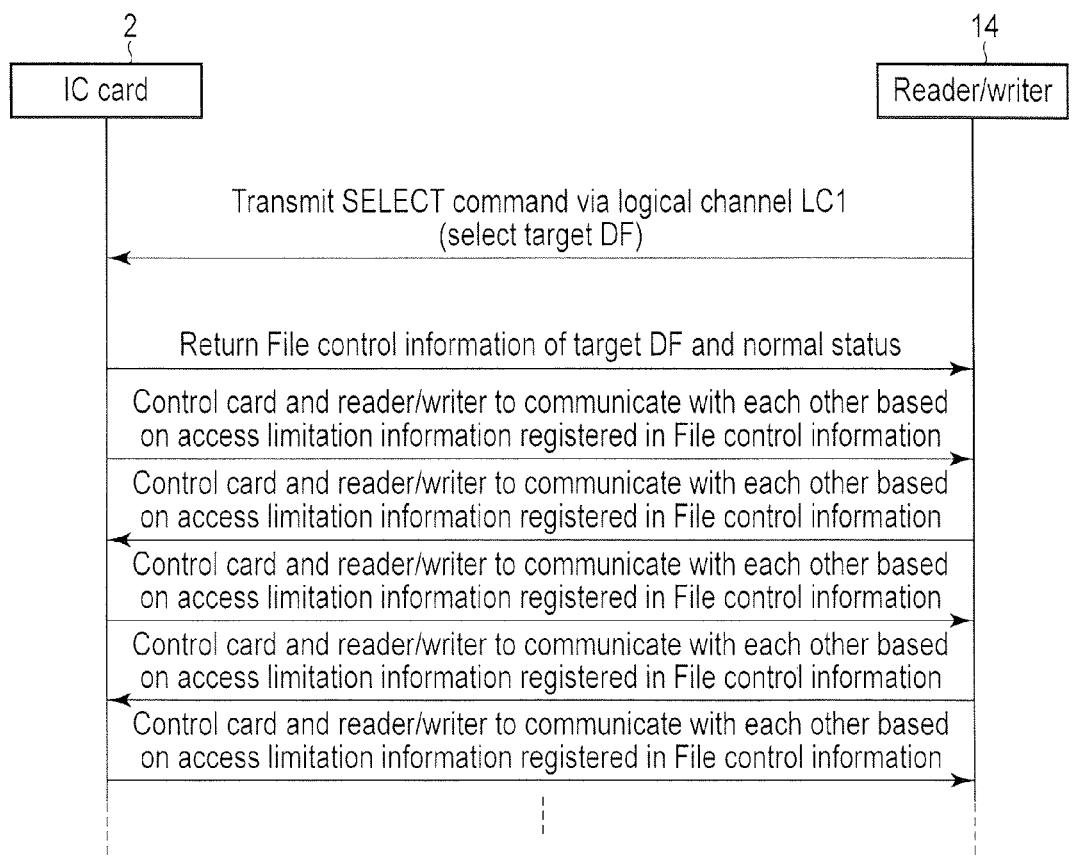
FIG. 7 is a flowchart showing an example in which the access limitation processing permits a data access via a predetermined logical channel.

FIG. 6 is a flowchart showing an example in which the access limitation processing denies a data access via a predetermined logical channel. FIG. 7 is a flowchart showing an example in which the access limitation processing permits a data access via a predetermined logical channel. FIGS. 12A and 12B are flowcharts showing an example of details of the access limitation processing by the IC card.

For example, as shown in FIG. 6, the reader/writer 14 transmits a select command (selection of DF421) to the IC card 2 via the logical channel LC2 supported by a predetermined communication interface. The IC card 2 receives the select command via the logical channel LC2. The CPU 204 of the IC card 2 denies an access to the DF421 based on the select command according to the access limitation information AL21 included in the FCI of the DF421, and returns the FCI of the DF421 and an abnormal status.

Also, as shown in FIG. 7, the reader/writer 14 transmits a select command (selection of DF421) to the IC card 2 via the logical channel LC1 supported by a predetermined communication interface. The IC card 2 receives the select command via the logical channel LC1. The CPU 204 of the IC card 2 permits an access to the DF421 based on the select command according to the access limitation information AL21 included in the FCI of the DF421, and returns the FCI of the DF421 and a normal status. After that, the reader/writer 14 and IC card 2 exchange data.

Furthermore, the aforementioned access limitation processing will be described in detail below with reference to FIGS. 12A and 12B. As shown in FIG. 12A, the IC card 2 receives a select command via one of the logical channels LC1, LC2, and LC3 (ST101).

The CPU 204 searches for a file (for example, the DF421) designated by the select command (ST102). If the CPU 204 finds the DF421 designated by the select command, it sets the DF421 as a current file (ST103). After that, the CPU 204 searches for FCI (for example, the EF422) corresponding to the DF421 based on an ID of the DF421 (ST104).

The CPU 204 finds out FCI having the same ID as that of the DF421 (YES in ST105), and checks data set in Tag86 of the found FCI (ST107). If the CPU 204 detects that Tag81 is not set in Tag86 (NO in ST108) but Tag82 is set (YES in ST111), it checks data set in Tag82 (ST112). The CPU 204 checks data set in Tag82, that is, access limitation information.

For example, a case will be assumed below wherein the IC card 2 receives a select command via the logical channel LC1 (ST101), and the access limitation information AL21 is set in Tag82 stored in the IC card 2. In this case, the CPU 204 permits a data access based on a reception command received via the logical channel LC1 according to the access limitation information AL21 (YES in ST113), and returns the FCI of the DF421 and a normal status (SW) (ST114).

Alternatively, a case will be assumed below wherein the IC card 2 receives a select command via the logical channel LC2 (ST101), and the access limitation information AL21 is set in Tag82 stored in the IC card 2. In this case, the CPU 204 denies a data access based on a reception command received via the logical channel LC2 according to the access limitation information AL21 (NO in ST113), re-sets a current file from the DF421 to an original file (ST118), and returns the FCI of the DF421 and an abnormal status (SW) (ST119).

As descried above, according to the second embodiment, an IC card and communication method, which can limit accesses for respective communication units (respective logical channels) can be provided.

Also, the aforementioned first and second embodiments can be combined. For example, the first communication interface 201a of the IC card 2 receives a select command via the logical channel LC1. The CPU 204 finds a DFxxx designated by the select command, and detects that Tag81 and Tag82 are set in FCI of the DFxxx. In this case, when the access limitation information AL11 is set in Tag81, and the access limitation information AL21 is set in Tag82, the CPU 204 permits a data access based on a reception command received via the logical channel LC1 of the first communication interface 201a according to the access limitation information AL11 and access limitation information AL21, and returns the FCI of the DFxxx and a normal status (SW). When the access limitation information AL11 and access limitation information AL21 are not set, the CPU 204 denies a data access based on a reception command received via the logical channel LC1 of the first communication interface 201a, and returns the FCI of the DFxxx and an abnormal status.

As described above, according to the combination of the first and second embodiments, an IC card and communication method, which can limit accesses for respective communication interfaces and respective logical channels can be provided.

The case has been explained wherein the access limitation processing limits an access to the DF. Alternatively, the access limitation processing can also limit accesses to data other than DF. For example, the access limitation processing can limit accesses to an EF, data object, tables, and views specified by ISO/IEC 7816-4:2005.

In the access limitation processing, the case has been explained wherein the access limitation information (Security attribute) is set at the time of issuance of the IC card (at the time of data registration in the IC card). However, the setting timing of the access limitation information is not limited to that described above, but it can be freely changed.

In the access limitation processing, the access limitations corresponding to reception of the select command have been explained. Alternatively, the access limitation processing can implement access limitations corresponding to reception of various data other than the select command.

For example, when an access to the DF411 occurs first, and an access to the DF421 occurs next, the reader/writer 14 can set, in advance, first access limitation information (for example, access limitation information AL11 or AL21) in the FCI of the DF411 and second access limitation information (for example, access limitation information AL12 or AL22) in the FCI of the DF421. Thus, a communication interface or a logical channel to the first data and a communication interface or a logical channel to the next data can be designated as different communication interfaces or logical channels, thus improving the security.

When a second DF is located under a first DF, and a third DF is located under the second DF, the IC card 2 can limit an access to the first DF by access limitation information set in FCI of the first DF, and can also limit accesses to the second DF and third DF by the access limitation information set in the FCI of the first DF.

Alternatively, the IC card 2 can limit only an access to the first DF by access limitation information set in the FCI of the first DF, and does not allow to limit accesses to the second DF and third DF by the access limitation information set in the FCI of the first DF.

When the IC card 2 stores a plurality of DFs, access limitation information can also be set for each DF. For example, when the data memory 205 of the IC card 2 stores DFs A and B, the reader/writer 14 sets first access limitation information (for example, access limitation information AL11 or AL21) in association with DF A of the IC card 2, and sets second access limitation information (for example, access limitation information AL12 or AL22) in association with DF B of the IC card 2. Then, for example, DF A of the IC card 2 can be used via the first communication interface 201a or logical channel LC1, but DF A of the IC card 2 cannot be used via other communication interfaces or logical channels. Likewise, DF B of the IC card 2 can be used via the second communication interface 201b or logical channel LC2, but DF B of the IC card 2 cannot be used via other communication interfaces or logical channels.

According to at least one of the aforementioned embodiments, accesses can be limited for respective communication interfaces or respective logical channels, and the security of the IC card system can be improved.

The respective embodiments will be summarized below.

(1) An IC card can set an execution condition for each communication interface. That is, the IC card can monitor access rights to various data according to communication interfaces to be used, and can deny accesses to various data when an unexpected communication interface is used.

(2) An IC card can set an execution condition for each logical channel. That is, the IC card can monitor access rights to various data according to logical channels to be used, and can deny accesses to various data when an unexpected logical channel is used.

The aforementioned IC card is manufactured by an IC card manufacturing apparatus (IC card manufacturing method). Also, the aforementioned IC card is issued by an IC card issuing apparatus (IC card issuing method).

For example, the IC card manufacturing apparatus manufactures an IC card based on a substrate (for example, a plastic card) and IC module (IC chip 20), as described above. The IC card issuing apparatus (for example, the terminal 1) writes issuance information in the data memory 205 or ROM 207 of an IC card (a white card on which no issuance information is recorded), thus issuing the IC card. The issuance information includes, for example, personal information.

According to at least one of the aforementioned embodiments, an IC card and communication method, which can limit accesses for respective communication units can be provided. Also, an IC card manufacturing method for manufacturing such IC card, and an IC card issuing method which issues such IC card can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card comprising:
    an IC module; and
    a substrate,
    the IC module comprising:
        a plurality of communication units;
        a storage unit configured to store a first file, and to store control information including an access condition for the first file
    wherein the access condition includes information which permits an access to the first file based on a reception command received via a first communication unit of the plurality of communication units; and
        a controller configured to:
            search for the first file designated by a first command, search for the access condition included in the control information of the first file, and permit an access to the first file based on the access condition when the first command is received via the first communication unit; and
            search for the first file designated by a second command, search for the access condition included in the control information of the first file, and not permit an access to the first file based on the access condition when the second command is received via a second communication unit of the plurality of communication units,
    wherein the second communication unit returns the control information, when the second command is received via the second communication unit and the controller does not permit the access to the first file based on the access condition.

2. The IC card of claim 1, wherein the plurality of communication units comprise a first communication interface and a second communication interface, and
    the controller is configured to permit, when the access condition includes information which permits an access to the first file based on the reception command received via the first communication interface, an access to the first file based on the first command received via the first communication interface, and not to permit an access to the first file based on the second command received via the second communication interface.

3. The IC card of claim 2, wherein the plurality of communication units comprise the first communication interface of a contact type and the second communication interface of a non-contact type, and
    the controller is configured to permit, when the access condition includes information which permits an access to the first file based on the reception command received via the first communication interface of the contact type, an access to the first file based on the first command received via the first communication interface of the contact type, and not to permit an access to the first file based on the second command received via the second communication interface of the non-contact type.

4. The IC card of claim 2, wherein the plurality of communication units comprise the first communication interface of a contact type and the second communication interface of a non-contact type, and
    the controller is configured to permit, when the access condition includes information which permits an access to the first file based on the reception command received via the second communication interface of the non-contact type, an access to the first file based on the second command received via the second communication interface of the non-contact type, and not to permit an access to the first file based on the first command received via the first communication interface of the contact type.

5. The IC card of claim 2, wherein the controller is configured to permit, when the access condition includes information which permits an access to the first file based on the reception command received via a first channel of the first communication interface, an access to the first file based on the first command received via the first channel of the first communication interface, and not to permit an access to the first file based on a third command received via a second channel of the first communication interface.

6. The IC card of claim 1, wherein the second communication unit returns the control information and an abnormal status, when the second command is received via the second communication unit and the controller does not permit the access to the first file based on the access condition.

7. An IC card comprising:
    an IC module; and a substrate,
the IC module comprising:
a communication unit configured to transmit/receive a file via a designated channel of a plurality of channels;
a storage unit configured to store a first file, and to store control information including an access condition for the first file,
wherein the access condition includes information which permits an access to the first file based on a reception command received via a first channel of the plurality of channels; and
a controller configured to:
search for the first file designated by a first command, search for the access condition included in the control information of the first file, and permit an access to the first file based on the access condition when the first command is received via the first channel; and
search for the first file designated by a second command, search for the access condition included in the control information of the first file, and not permit an access to the first file based on the access condition when the second command is received via a second channel of the plurality of channels,
wherein the communication unit returns the control information, when the second command is received via the second communication unit and the controller does not permit the access to the first file based on the access condition.

8. The IC card of claim 7, wherein the second communication unit returns the control information and an abnormal status, when the second command is received via the second communication unit and the controller does not permit the access to the first file based on the access condition.

9. An IC card manufacturing method comprising:
manufacturing an IC card,
wherein the IC card comprises:
an IC module; and
a substrate, and
the IC module comprises:
a plurality of communication units;
a storage unit configured to store a first file, and to store control information including an access condition for the first file,
wherein the access condition includes information which permits an access to the first file based on a reception command received via a first communication unit of the plurality of communication units; and
a controller configured to:
search for the first file designated by a first command, search for the access condition included in the control information of the first file, and permit an access to the first file based on the access condition when the first command is received via the first communication unit; and
search for the first file designated by a second command, search for the access condition included in the control information of the first file, and not permit an access to the first file based on the access condition when the second command is received via a second communication unit of the plurality of communication units,
wherein the second communication unit returns the control information, when the second command is received via the second communication unit and the controller does not permit the access to the first file based on the access condition.

10. The IC card manufacturing method of claim 9, wherein the second communication unit returns the control information and an abnormal status, when the second command is received via the second communication unit and the controller does not permit the access to the first file based on the access condition.

11. An IC card issuing method comprising:
storing issuance information in a storage unit of an IC card; and
issuing the IC card,
wherein the IC card comprises:
an IC module; and
a substrate, and
the IC module comprises:
a plurality of communication units;
the storage unit configured to store first file, and to store control information including an access condition for the first file,
wherein the access condition includes information which permits an access to the first file based on a reception command received via a first communication unit of the plurality of communication units; and
a controller configured to:
search for the first file designated by a first command, search for the access condition included in the control information of the first file, and permit an access to the first file based on the access condition when the first command is received via the first communication unit; and
search for the first file designated by a second command, search for the access condition included in the control information of the first file, and not permit an access to the first file based on the access condition when the second command is received via a second communication unit of the plurality of communication units,
wherein the second communication unit returns the control information, when the second command is received via the second communication unit and the controller does not permit the access to the first file based on the access condition.

12. The IC card issuing method of claim 11, wherein the second communication unit returns the control information and an abnormal status, when the second command is received via the second communication unit and the controller does not permit the access to the first file based on the access condition.

13. A communication method comprising:
searching for a first file designated by a first command, searching for an access condition included in control information of the first file, and permitting an access to the first file based on the access condition, when the first command is received via a first communication unit of a plurality of communication units and the access condition includes information which permits an access to the first file based on a reception command received via the first communication unit; and
searching for the first file designated by a second command, searching for the access condition included in the control information of the first file, not permitting an access to the first file based on the access condition, and returning the control information including the access condition for the first file according to reception of the second command by the second communication unit, when the second command is received via a second communication unit of the plurality of communication units and the access condition includes the information which permits an access to the first file based on the reception command received via the first communication unit.

14. The communication method of claim 13, wherein the second communication unit returns the control information and an abnormal status, when the second command is received via the second communication unit and the access to the first file based on the access condition is not permit.

* * * * *